United States Patent [19]

van der Werff

[11] Patent Number: 5,222,585
[45] Date of Patent: Jun. 29, 1993

[54] CONVEYOR TABLE

[75] Inventor: Jeichienus A. van der Werff, Montfoort, Netherlands

[73] Assignee: Hadewe B.V., Drachten, Netherlands

[21] Appl. No.: 627,508

[22] Filed: Dec. 14, 1990

[30] Foreign Application Priority Data

Dec. 14, 1989 [NL] Netherlands .................. 8903070

[51] Int. Cl.$^5$ ............................................. B65G 37/00
[52] U.S. Cl. ................................. 198/372; 198/787; 198/790; 193/35 MD
[58] Field of Search ............ 198/372, 787, 789, 782, 198/790, 791; 193/35 MD

[56] References Cited

U.S. PATENT DOCUMENTS

| | | | |
|---|---|---|---|
| 1,460,539 | 7/1923 | Edwards | 198/791 |
| 1,660,327 | 2/1928 | Evans | 198/782 X |
| 3,739,894 | 6/1973 | Hinman | 193/35 MD |
| 3,828,917 | 8/1974 | Oestergren | 198/789 |
| 3,888,342 | 6/1975 | Geller | 198/780 |
| 3,920,290 | 11/1975 | Evarts | 193/35 MD |
| 3,978,975 | 9/1976 | Herbes et al. | 198/782 |
| 4,180,150 | 12/1979 | Moore | 198/787 X |
| 4,399,675 | 8/1983 | Erdmann et al. | 198/782 X |
| 4,660,994 | 4/1987 | Masciarelli | 193/35 MD |
| 4,696,583 | 9/1987 | Gorges | 193/35 MD |
| 4,706,793 | 11/1987 | Masciarelli | 193/35 MD |
| 4,732,490 | 3/1988 | Masciarelli | 193/35 MD X |
| 4,852,721 | 8/1989 | Stille | 198/789 X |
| 4,871,052 | 10/1989 | Huber | 193/35 MD |
| 4,913,277 | 4/1990 | Zörgiebel et al. | 198/782 |
| 5,012,914 | 5/1991 | Berends et al. | 198/782 X |

FOREIGN PATENT DOCUMENTS

| | | |
|---|---|---|
| 0311699 | 10/1976 | European Pat. Off. |
| 0276881 | 8/1988 | European Pat. Off. ...... 193/35 MD |
| 1237003 | 3/1967 | Fed. Rep. of Germany . |
| 1931701 | 1/1971 | Fed. Rep. of Germany . |
| 2117546 | 10/1972 | Fed. Rep. of Germany . |
| 8629392 | 5/1987 | Fed. Rep. of Germany . |
| 2167878 | 8/1973 | France . |
| 0056202 | 3/1987 | Japan ................................ 198/782 |
| 8907081 | 8/1989 | PCT Int'l Appl. ........... 193/35 MD |

Primary Examiner—Robert P. Olszewski
Assistant Examiner—Cheryl L. Gastineau
Attorney, Agent, or Firm—Burns, Doane, Swecker & Mathis

[57] ABSTRACT

A conveyor table for displacing articles along a transporting surface includes a support construction and substantially rotation-symmetrical conveyor members, the conveyor members being suspended for rotation about axes thereof relative to the support construction, circumferential portions of the conveyor members defining the plane of transport. The direction of transport of the conveyor members is adjusted by rotating said conveyor member relative to the support construction about a line perpendicular to the plane of transport. A guard includes substantially circular openings, through which openings extend corresponding conveyor members. The guard screens the system for operating and driving the conveyor members from the user and the articles to be transported and makes it possible to arrange to the conveyor members at a relatively great distance from one another.

8 Claims, 6 Drawing Sheets

CONVEYOR TABLE

FIELD OF THE INVENTION

This invention relates to a conveyor table for displacing along a transporting surface articles with at least one substantially flat side and, more particularly, a conveyor table wherein the direction of transport of conveyed articles is controllable.

BACKGROUND OF THE INVENTION

The desirability of conveyor table capable of steering an article in a desired direction has long been recognized. Such a conveyor is known from U.S. Pat. No. 4,180,150. In that reference, by turning rotation-symmetrical conveyor members about a corresponding second line perpendicular to the plane of transport, the direction of transport of the conveyor members can be adjusted, so that the articles can be displaced in a plurality of directions along the conveyor members and thus along the transport surface. The position of the axis of rotation of each conveyor member corresponds in each case with the direction of displacement of the portion of an article that rests against that conveyor member.

In the known conveyor table the conveyor members are mounted on the support construction, standing free therefrom. This carries with it the drawback that a relatively large number of conveyor members are required to ensure that flexible articles, such as sheets of paper, and also small articles, can be conveyed over the table without getting between the conveyor members by bending or falling. A further drawback is that parts of the body of a person operating the table can be caught between the conveyor members. Yet another drawback is that the control means are arranged above the support construction, whereby these means may get contaminated relatively quickly and constitute a hazard for users of the conveyor table. Furthermore, the conveyor members suspended above the support construction form obstacles which make it more difficult to clean the conveyor table.

U.S. Pat. No. 3,828,917 discloses a conveyor table with spherical conveyor members each retained in position by an opening in a guard plate and each resting on a separate, corresponding disc which is rotatable about an axis perpendicular to the guard plate. The discs are suspended in a support construction which can be displaced relative to the guard plate along a circular path parallel to the guard. Drawbacks of that conveyor table are that great friction will occur between the conveyor members and the edges of the corresponding openings, that the bearings of the discs will be very heavily loaded by the articles to be conveyed, and that controlled, quick changes of the rate and direction of transport are not possible owing to mass inertia of the transport members, each being in contact with the corresponding disc only through their own weight.

OBJECTS AND SUMMARY OF THE INVENTION

It is an object of the invention to provide a conveyor table in which the drawbacks mentioned are obviated.

This object is accomplished according to the invention by virtue of the fact that in a conveyor table of the type described above, parallel to the plane of transport a guard is arranged having substantially circular openings, at least a number of said openings each having one of said conveyor members extending through them and each of said conveyor members having its corresponding second line extending virtually through the center of the corresponding opening.

Owing to the fact that the conveyor table is provided with a guard any articles in contact with that table, which will tilt for lack of support by the conveyor members, will be taken up by the guard and can be glidingly displaced by the conveyor members with which those articles are in contact, until they have reached any next conveyor members or are removed from the table.

The guard, moreover, keeps the control means and the greater part of the transport means out of the reach of the user of the table and protects the control means and the transport means against contamination.

In the table according to the invention the conveyor members extend above the guard only over a small distance, so that the surface of the guard is easy to clean.

By virtue of the fact that the openings are circular and the corresponding second line of each of those conveyor members in each case intersects the center of the corresponding opening, each conveyor member extending through one of those openings can be turned relatively to the guard about the corresponding second line without the member engaging or abutting against the edge of the corresponding opening.

BRIEF DESCRIPTION OF THE DRAWINGS

Some embodiments of the invention will now be further explained and illustrated with reference to the accompanying drawings, in which.

DETAILED DESCRIPTION OF THE INVENTION

Figure 1:
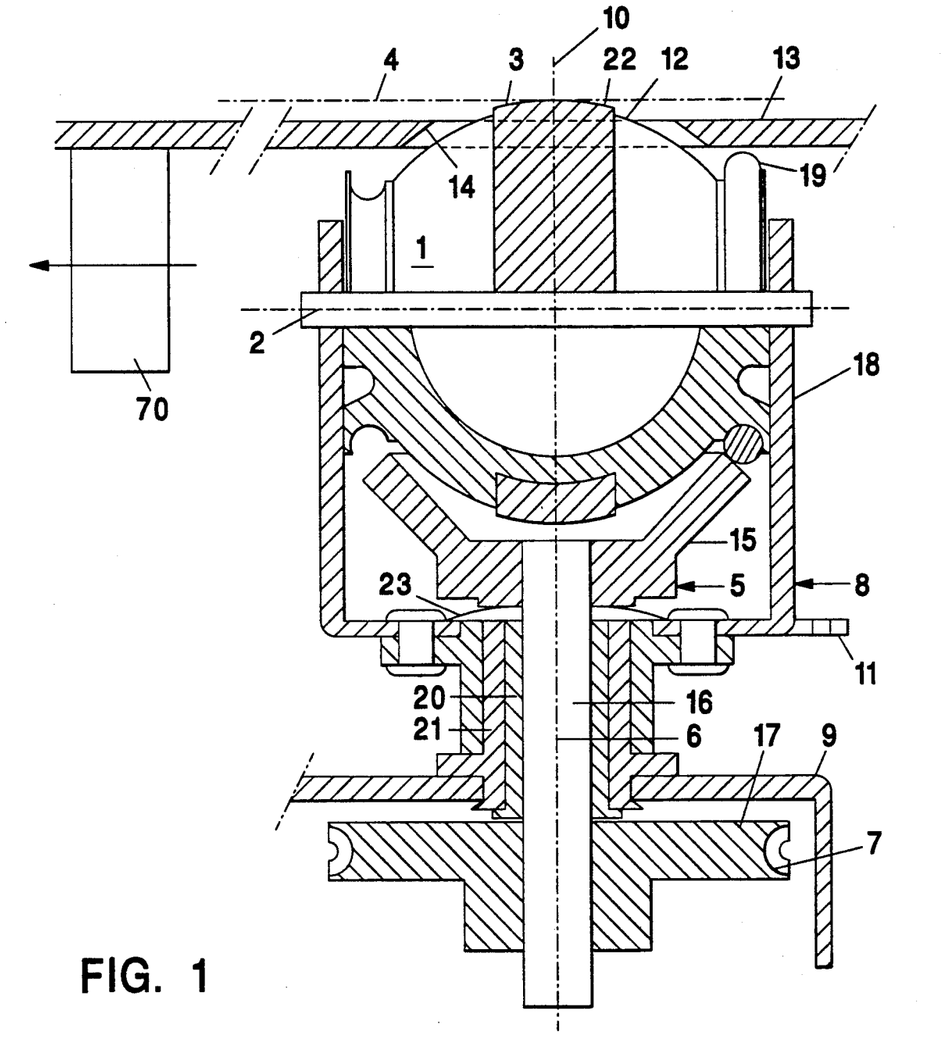
FIG. 1 is a sectional side view of a portion of a conveyor table.

The portion of an embodiment of a conveyor table according to the invention shown in FIG. 1 is a conveyor unit supported by a support construction 9. The conveyor unit comprises a conveyor member 1. The conveyor member 1 has a rotation-symmetrical shape and is suspended relative to the support construction 9 for rotation about its axis or line 2.

To that effect, the conveyor member 1 is suspended for rotation about its axis 2 in a suspension member 8 which in turn is suspended for rotation about the second axis or line 10 relatively to the support construction 9. A circumferential portion 3 of the conveyor member 1, together with similar circumferential portions of further conveyor members 1 constituting the conveyor table, defines a plane of transport 4. The direction of transport of the conveyor member 1 can be adjusted by turning that conveyor member 1 relative to the support construction 9 about a second line 10 perpendicular to the plane of transport 4. Arranged parallel to the plane of transport 4 is a guard 13 having substantially circular openings 14, one of which is shown in cross-section in FIG. 1. The conveyor member 1 extends through the openings 14 and is arranged relative to the opening 14 in such a way that the corresponding second line 10 extends through the center of that opening 14.

In virtue of the fact that the transport table is provided with a guard 13, an article that is being conveyed over that table and will tilt for lack of support by conveyor members 1, can be taken up by the guard 13 and can be displaced glidingly over the guard 13 by the conveyor members 1 which that article is in contact with, until that article reaches one of any further conveyor members 1 or is removed from the table.

For the control of the orientation of the conveyor member 1 about the second line 10, the suspension member 8 is provided with a control arm 11, to which a control rod or a control grid (see FIGS. 7 and 8) can be connected for driving the rotation of the conveyor member 1 about the line perpendicular to the plane of the transport 4.

The guard 13 moreover keeps the control means which connect to the control arm 11 and the greater part of the conveyor units out of the reach of the user of the table and protects these units against contamination.

In the table according to the invention the conveyor members 1 extend above the guard 13 only by a minor distance, so that the surface of the guard 13 is easy to clean.

By virtue of the fact that the openings 14 are circular and the corresponding second line 10 of each of those conveyor members 1 in each case intersects the center of the corresponding opening 14, each conveyor member 1 extending through one of those openings 14 be turned relatively to the guard 13 about the second line 10 corresponding with that member 1 without that member engaging or abutting against the edge of the corresponding opening 14.

By means of friction transmission, the conveyor member 1 is coupled to a rotation-symmetrical transmission member 5 which is rotatable about its axis 6. This axis 6 is perpendicular to the plane of transport 4. According to the embodiment shown, the transmission member 5 is provided with a continuous groove 7 for cooperation with a driving rope (see FIG. 6). For the sake of clarity, driving ropes are not shown in FIGS. 1-5. Naturally, for driving the transmission members, other means can be used instead of a driving rope, such as a chain, a geared belt, a toothed wheel or a worm.

Owing to the fact that the axis 6 of the transmission member 5 is perpendicular to the plane of transport 4, the position of the plane in which the transmission member 5 can rotate is oriented parallel to the plane of transport 4, so that the rope may be provided in any desired directions parallel to the plane of transport 4. This gives a great measure of freedom as to the arrangement of the power source, which can be arranged in any desired location in directions parallel to the plane of transport 4. The mutual coupling of transmission members 5 is also easy, irrespective of their mutual arrangement in directions parallel to the plane of transport 4.

The second line 10 and the axis 6 of the transmission member 5 are coaxial. As a result, the position of the transmission member 5 relative to the support construction remains unchanged, irrespective of the orientation of the axis of rotation 2 of the conveyor member 1.

The conveyor member 1 has a circumferential portion 12 which during rotation of that conveyor member 1 about its axis 2 extends through the corresponding opening 14. This circumferential portion 12 is constructed as a part of a sphere extending about that axis 2, which sphere seals the corresponding opening 14 except for an annular outer portion thereof.

Accordingly, the spherical portion 12 of the conveyor member 1 partly extends continuously through the corresponding opening 14. The annular gap is maintained irrespective of the orientation of the axis 2 of the conveyor member 1.

An advantage of this embodiment of the invention is that an article that is slid into contact with the conveyor member 1 in a direction transverse to the direction of transport of the member, is guided along the circumferential portion 12 of that conveyor member 1 towards the circumferential portion 3 thereof, which co-defines the plane of transport 4 and will further convey the article.

The opening 14 is virtually closed, so that any articles, parts of the body of persons within reach of the table and dirt will rarely be in a position to pass between the conveyor member 1 and the guard 13 or be caught between them.

The circumferential portion 3 referred to is coated with a layer of rubber 22. This rough material prevents the occurrence of slip between the articles and the conveyor member 1 when articles are being conveyed at high speeds.

The transmission member 5 comprises a bevel gear 15, a driving wheel 17 in which the groove 7 for receiving the driving rope (not shown) is provided and a shaft 16 which connects the wheels 15 and 17, restrained from mutual rotation. The suspension member 8 has a U-shaped fork 18 in which the conveyor member 1 is suspended and within which the bevel gear 15 is suspended. The shaft 16 extends from the bevel gear 15 mounted thereon, through the bottom of the U-shaped fork 18 of the suspension member 8 under and through the support construction 9 to the driving wheel 17.

The bevel gear 15 engages with the conveyor member 1 by means of a frictional force which is exerted on a rubber ring 19 provided about the conveyor member 1. The shaft 16 is bearing-mounted relatively to the support construction 9 in a bearing bushing 20 which is suspended in a support tube 21 which in turn is clamped in the support construction 9. The suspension member 8 is bearing-mounted on the outer surface of that support tube 21.

Any forces exerted on the conveyor member 1 are taken up by the U-shaped fork 18 of the suspension member 8. The bevel gear 15 is retained against the conveyor member 1 by means of a Belleville washer 23 for generating a normal force for the purpose of exerting the above mentioned frictional force on the ring 19.

According to another preferred embodiment of the invention at least one of the conveyor members is suspended in a suspension member, characterized in that said suspension member is provided with an opening which said conveyor member extends through, said suspension member being substantially circular in section in the plane of the guard and filling up the corresponding opening, except for an annular outer portion thereof, that is.

Figure 2:
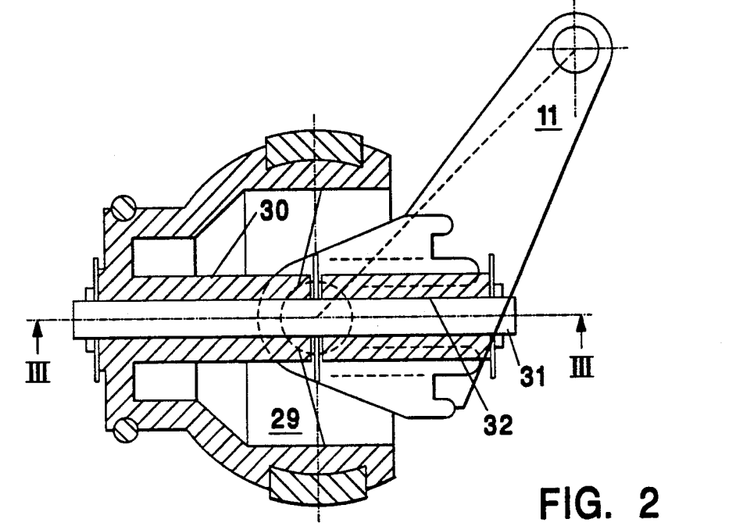
FIG. 2 is a sectional, top view of a conveyor table taken along the line II—II of FIG. 3.
Figure 3:
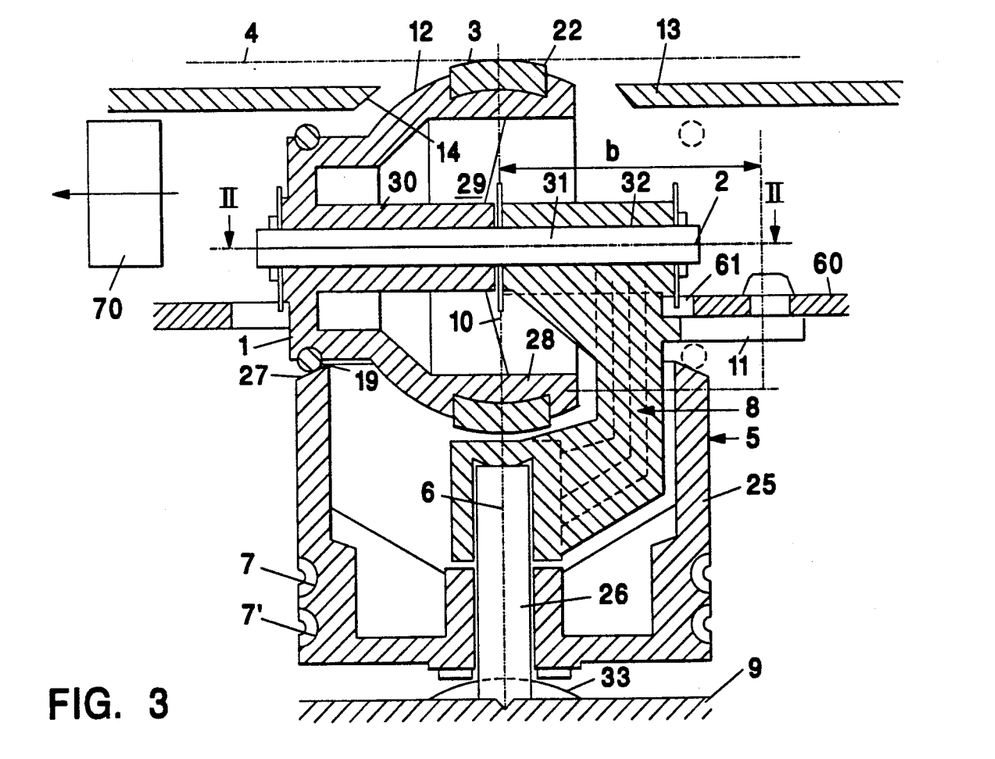
FIG. 3 is a sectional side view taken on the line III—III of FIG. 2.

In the embodiment shown in FIGS. 2 and 3, the suspension member 8 is of C-shaped construction, leaving one end face of the conveyor element free. The transmission member 5 is provided with an annular flange 25 which extends around the suspension member 8 and a free edge 27 of which engages a rubber ring 19 arranged around the conveyor member 1 in the area of the free end face. The C-shaped suspension member 8 forms an arc which extends about a continuous flange 28 of the conveyor member 1. This flange 28 comprises the spherical circumferential portion 12 and the circumferential part 3, which co-defines the plane of transport 4. Within the flange 28 radial ribs 29 extend to a cylindrical portion 30 which is bearing-mounted on a shaft 31 and is arranged coaxially with the axis 2 of the conveyor member 1. The shaft 31 is further mounted in a bore 32 in the suspension member 8 and transmits forces which are exerted on the conveyor member 1 to the suspension member 8.

The suspension member 8 is bearing-mounted on the free end of a pin 26 projecting from the support construction 9. Pressure forces on the conveyor member 1 are transmitted via the suspension member 8 to the end of the pin 26.

Further, between the suspension member 8 and the support construction 9 the transmission member 5 is bearing-mounted on the pin 26. By means of a Belleville washer 33, this transmission member 5 is pressed against the rubber ring 19 mounted on the conveyor member 1, with a clearance being maintained between the transmission member 5 and the suspension member 8.

In addition to a first groove 7, a second groove 7' is provided in the transmission member 5. One of the grooves can receive a rope which drives the transmission member, while the other of the two grooves 7 and 7' can receive a further rope which is intended for driving a transmission member of another conveyor unit.

At its free end, the control arm 11 of the suspension member 8 is connected to a control grid 60 for hinging movement. The control grid has openings 61, FIG. 3 showing one of them. The suspension member 8 can be turned by displacing the control grid 60 translatingly along a circular path which is selected such that the point of the control grid 60 through which extends the shaft of the hinge connection with the control arm 11, is maintained at a constant distance b from the second line 10.

An advantage of such a control is that an accurate, low-clearance and wear-resistant control and hence an accurate mutual alignment of the conveyor members 1 can be accomplished. The mutual distance between the conveyor units which is necessary to allow the control grid 60 extending between them sufficient freedom of movement, can be maintained in the conveyor table according to the invention in virtue of the fact that the guard plate 13 takes care of a guidance of the articles between the conveyor members 1.

Figure 7:
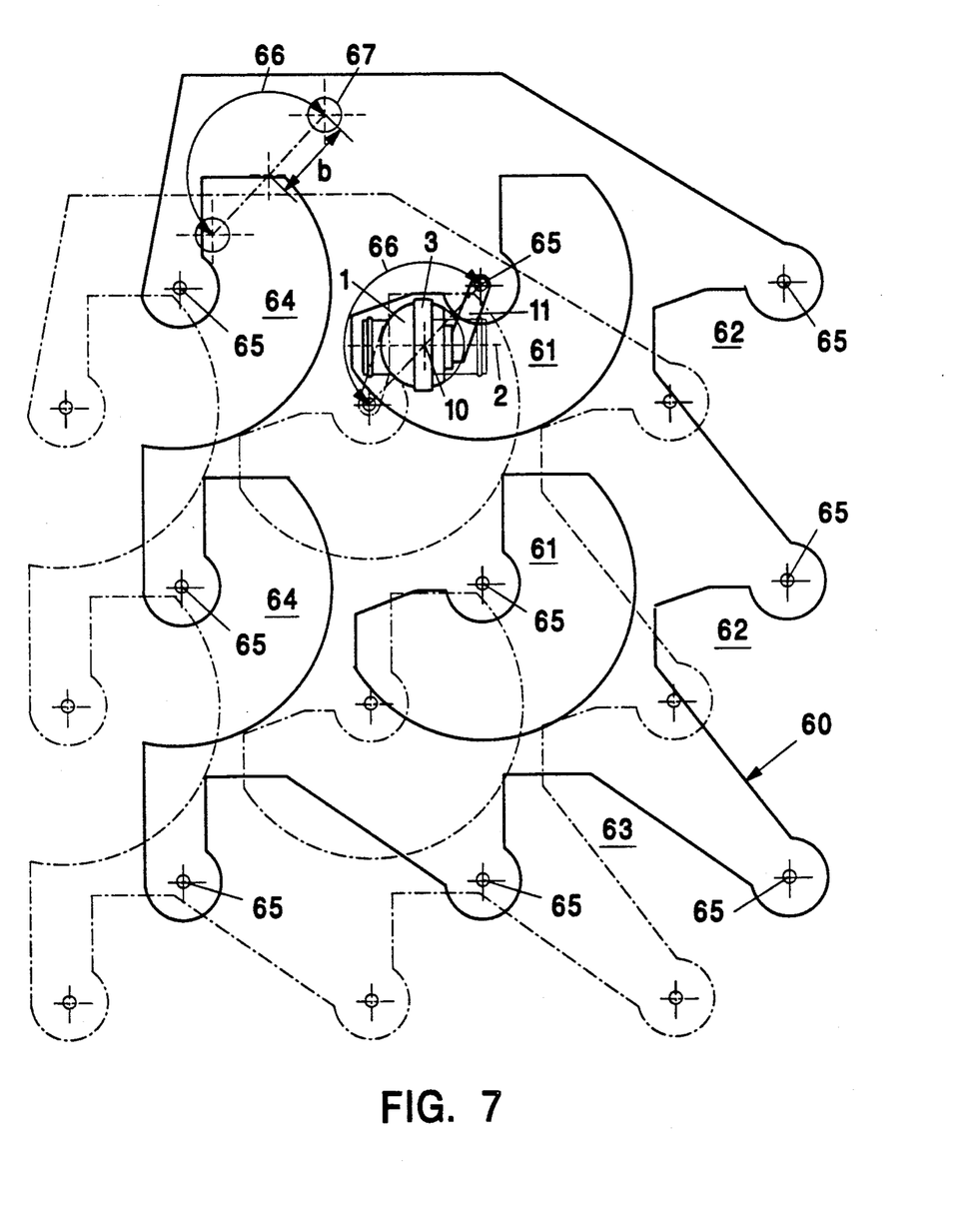
FIG. 7 shows a control grid for controlling a table with a conveyor unit according to FIGS. 2 and 3.

FIG. 7 shows a control grid suitable for combination with a conveyor unit according to FIGS. 2 and 3. In one of the openings 61 a conveyor unit is shown. In addition to the openings 61, the control grid has a plurality of recesses 62, 63, and 64 along its circumference, which are formed to enable like rotation of the corresponding conveyor members about the corresponding second lines. The grid further comprises a plurality of mounting holes 65. In mounted position, in similar manner as in the case of the conveyor unit shown, a control arm 11 of a conveyor unit is connected to each of the holes 65. The thin chain-dotted lines represent the conveyor unit in a position where it has been turned through an angle of 180° about the second line 10. The corresponding position of the control grid 60 is also indicated by thin chain-dotted lines. For turning the conveyor unit between the two positions indicated, the control grid is displaced translatingly along a portion of a circular path indicated by arrows 66. The drive of the displacement can be effected by means of a pin which engages a hole 67. It is also possible, however, to drive the rotation about the second line of one of the conveyor members 1, with the other conveyor members 1 being moved along by the corresponding control arms 11 and the control grid 60. It is observed that in order to create the possibility of transport in all directions of the plane of transport it is sufficient to provide for each conveyor member 1 to be rotatable through 180° about its second line 10 and for reversibility of the direction of rotation of each conveyor member 1 about its axis 2.

Figure 8:
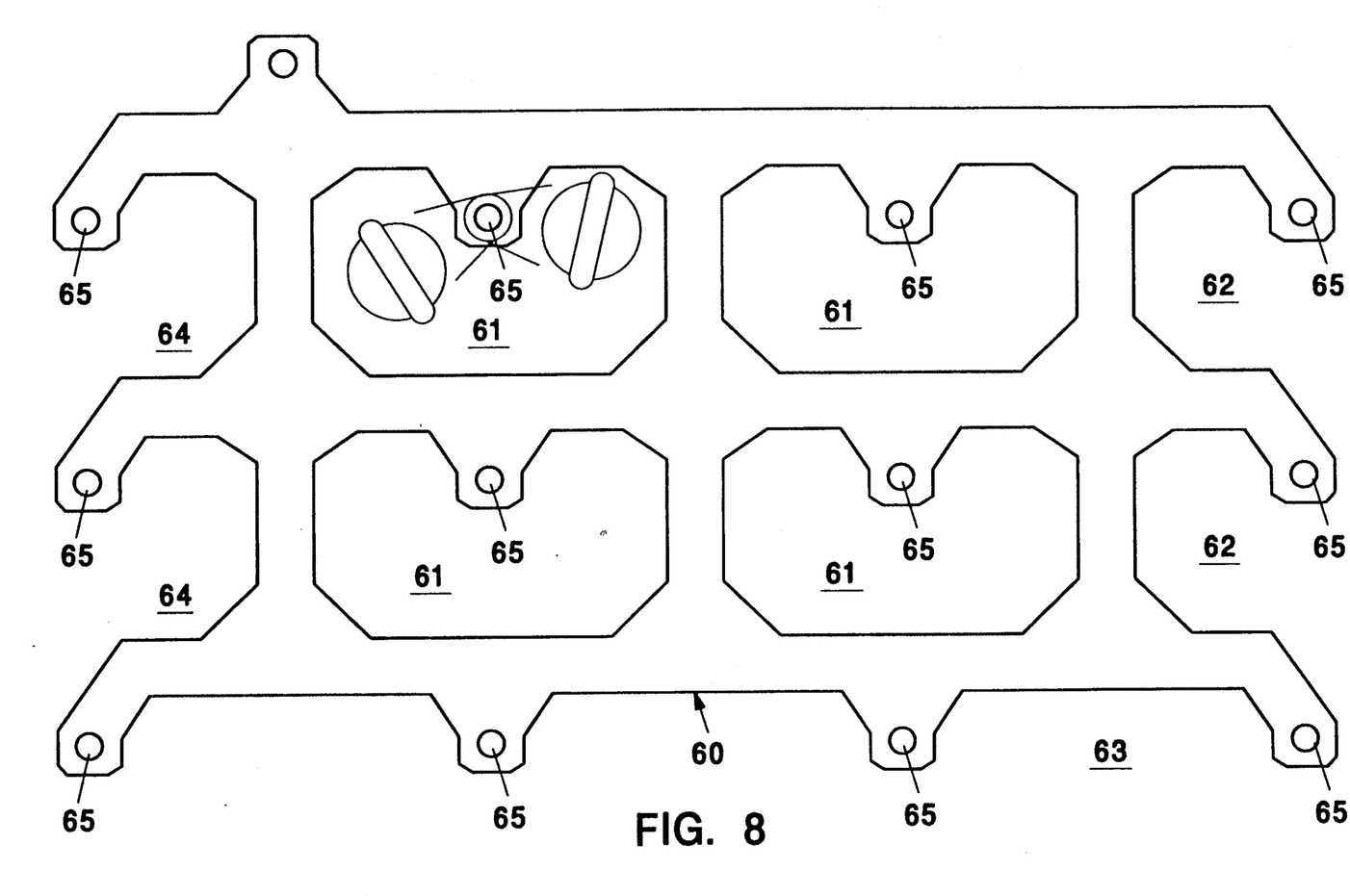
FIG. 8 shows a second embodiment of a control grid.

FIG. 8 shows a further example of a control grid 60 with openings 61, recesses 62, 63, and 64, and mounting holes 65. Such a control grid 60 is for instance suitable for use in a conveyor table according to FIG. 6 and with conveyor units in which the control arm extends along the axis 2. In one of the openings 61 a conveyor unit is schematically represented in two positions where it has been pivoted relative to the control grid 60. It is observed that when mounted, the control grid moves about the second line 10 of each conveyor member, as described hereinabove.

The grid may also be connected to the free ends of each of the control arms by means of pin-slot connection, instead of a hinge joint. In that case a rectilinear translating displacement of the control grid can be converted into rotation of the conveyor members about the corresponding second lines.

Figure 4:
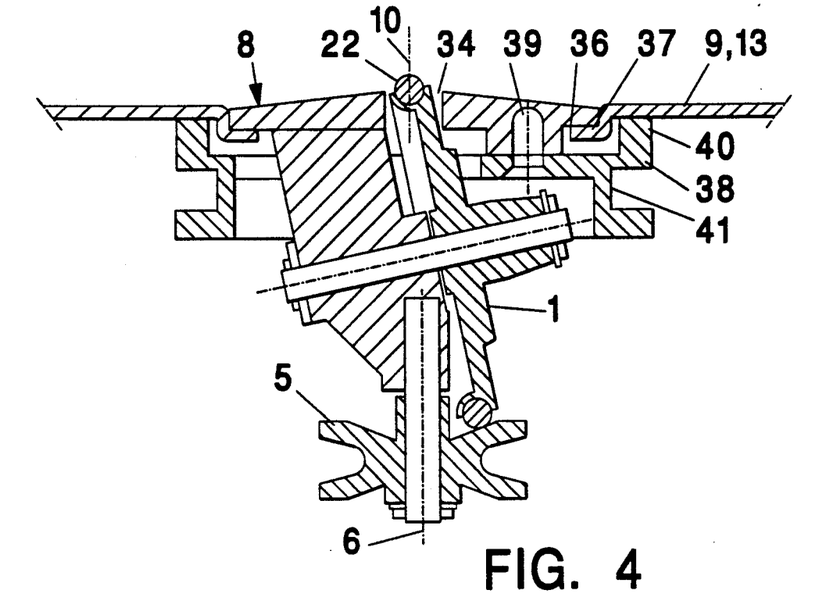
FIG. 4 is sectional view of a portion of a conveyor table.
Figure 5:
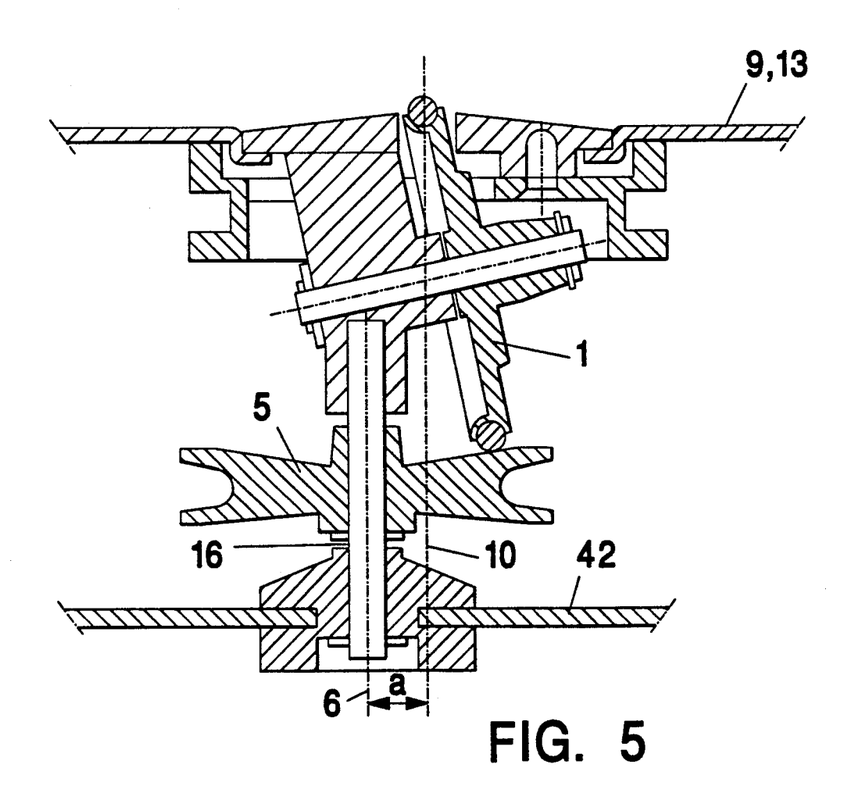
FIG. 5 is a view similar to FIG. 4 of a further embodiment of the invention.

In the conveyor units shown in FIGS. 4 and 5, each of the conveyor members is suspended in a suspension member 8 and provided with an opening 34 which the corresponding conveyor member 1 extends through. The suspension member 8 comprises a guarding portion 35 which is circular in section in the plane of the guard 13 and fills up the corresponding opening 36.

During rotation of the conveyor member 1 about the second line 10, the guarding portion 35 of suspension member 8 rotates along with it about that same line 10 and thus a closely fitting guard can be obtained irrespective of the form and the position of the conveyor member 1. In virtue thereof, the conveyor member 1 may be of light construction and inexpensive to manufacture, without a large passage arising between that conveyor member 1 and the circumference of the opening 36. At the same time, this gives greater freedom as to the construction of the surface between the edge of the opening 36 and the portion of the conveyor member 1 that, at least partly, defines the plane of transport 4. This surface may for instance be chosen such that articles sliding over the guard 13 in a direction transverse to the direction of transport of a conveyor member 1 are fluently guided to the portion of the conveyor member 1 which, at least partly, defines the plane of transport 4.

A further advantage of this embodiment is that the guard 13 can also be used, along with other means, to support the suspension member 8. This option has been used in this embodiment in that the guard 13 also forms the support construction 9 and the suspension member 8 is suspended in the corresponding opening 36 in the guard 13. In this way a simple cost-reducing construction of the conveyor table according to the invention can be accomplished. A further advantage is the option of arranging a control grid under the transmission members 5. This renders superfluous the necessity of providing sufficient freedom of movement for the control grid between the conveyor units, so that they can be arranged at a smaller mutual distance. Moreover, when the control arms 11 are also arranged under the transmission members 5, displacement of the control grid along a full circle can be obtained.

It is observed that when the suspension member 8 is not constructed in such a way that it receives support from the guard 13, between the edge of each opening 36 and the corresponding suspension member 8 an annular gap can be left open to enable low-friction rotation of the suspension member 8.

By means of a screw 39 a retaining member 38 is mounted on the bottom of the suspension member. The retaining member 8 comprises a continuous upright ridge 40, which extends into the vicinity of the combined support construction-guard plate 9, 13.

The direction of transport of the conveyor member 1 can be changed by rotating the suspension member 8 in the opening 36 in which it is bearing-mounted in the recess 37. In respect of this rotation option it is important that there is some clearance between the retaining member 38 and the bottom of the combined support construction-guard plate 9, 13.

The suspension member 8 is provided with a continuous ring groove 41 which is coaxial with the opening 36 to be engaged by a rope for driving the rotation of the conveyor member about the second line 10.

In the conveyor unit according to FIG. 4 the transmission member 5 is suspended from the suspension member 8 in such a way that the axis of rotation 6 of the transmission member 5 is coaxial with the second line 10, about which line the conveyor member 1 can rotate via the suspension member 8 that is bearing-mounted in the recess 37. Thus the position of the transmission member 5 relative to the support construction 9 remains unchanged when the direction of transport of the conveyor member 1 is changed.

In the conveyor table according to FIG. 5, the second line 10 of each of the conveyor members 1 is disposed at a distance a from the corresponding axis of rotation 6 of the transmission member 5. At its end remote from the suspension member 8, the shaft 16 of each of the transmission members 5 is rotatably connected at a fixed place with a control grid 42. The control grid can be translatingly displaced relatively to the support construction 9 along a circular path having a radius equaling the distance a between the second line 10 and the axis of rotation 6 of the transmission member 5.

In this embodiment of the invention, too, a displacement of the control grid along a full circle can be provided. A further advantage of this embodiment is the simple construction due to the fact that the control arm is integrated into the suspension member 8 and the shaft 16 of the transmission member 5 also forms a pin for the pivoting connection between the suspension member 8 and the control grid 42.

Preferably, a further transmission member (not shown) is provided at a fixed place on the control grid 42, which transmission member may be connected to a power source or a transmission member suspended from the support construction and whose position in axial direction corresponds to that of the transmission member 5 of at least one of the conveyor units. One advantage of this is that upon rotation of the conveyor member 1 about the second line 10, the position of the transmission member 5 of one of the conveyor units relative to the further transmission member remains unchanged and hence no special measures are necessary to maintain the mutual engagement of these transmission members.

Figure 6:
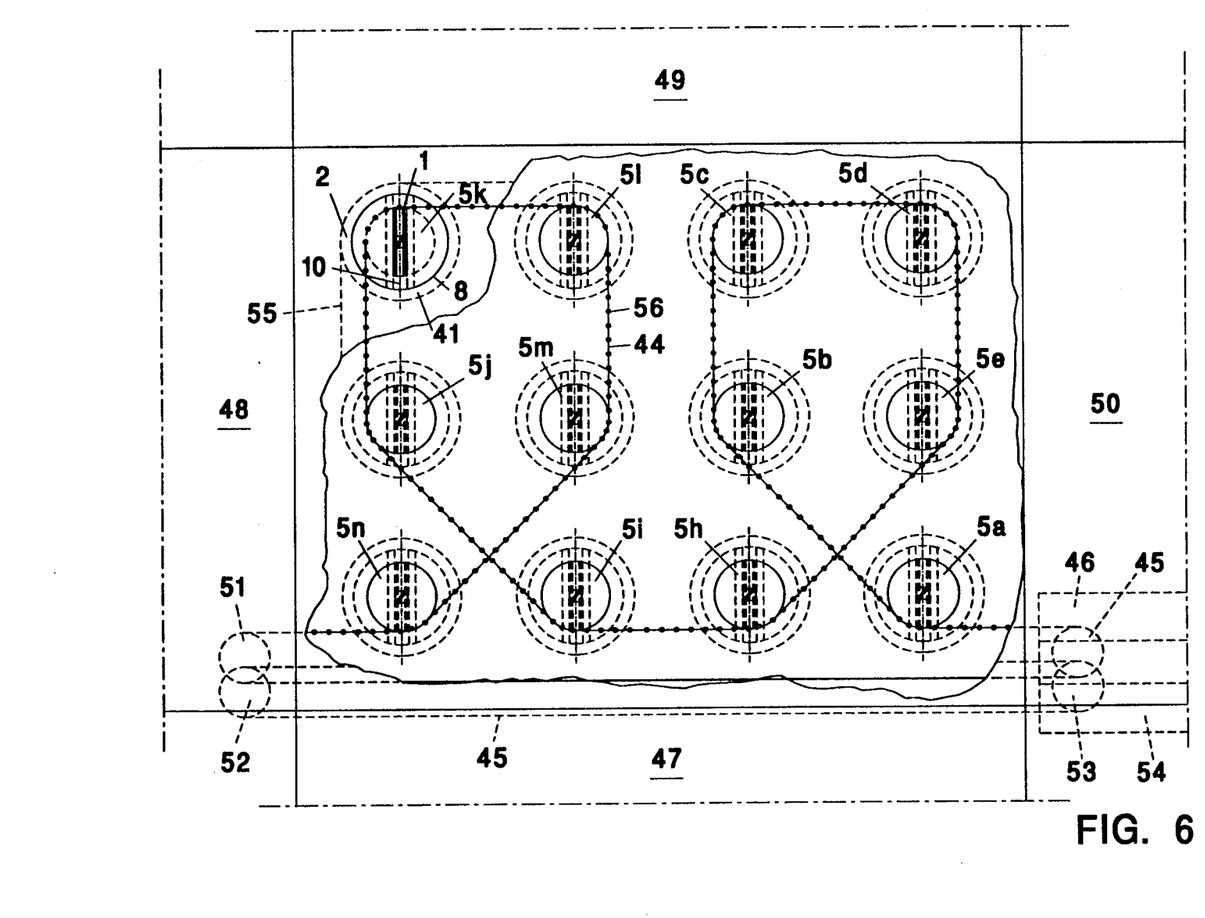
FIG. 6 is a partly cutaway top view of a conveyor table.

FIG. 6 shows one example of a conveyor table in which twelve conveyor members 1 are combined to comprise a unit 43.

Connecting to the conveyor table are a supply track 47 as well as three discharge tracks 48, 49, 50. When the conveyor members 1 are in the position shown when an article reaches the conveyor table, that article will be conveyed to the discharge track 49 diametrically opposite the supply track 47. For an article to be conveyed to the left-hand or right-hand discharge track 48 or 50, the conveyor members 1 can be rotated about the respective second lines 10 thereof (see FIG. 4) counter-clockwise and clockwise, respectively, while the article is disposed on the conveyor table.

A first rope 44 for driving the rotation of the conveyor members 1 about the respective axes 2 thereof, is in engagement with the transmission members 5a–5n, with a first driving wheel 45 which is directly connected to a power source 46 and a first bend wheel 51. A second rope 55 for driving the rotation of the conveyor members 1 about the respective second lines 10 is in engagement with grooves 41 in the suspension members 8, which grooves 41 are each coaxial with the opening 36, a second bend wheel 52 and a second driving wheel 53. The second rope is trained on the suspension members 8, the second bend wheel 52 and the second driving wheel 53 in the same way as the first rope 44 is trained on the transmission members 5a–5n, the first bend wheel 51, and the first driving wheel 45.

The ropes 44 and 55 may for instance be belts toothed on opposite sides or chains. According to the embodiment shown, the ropes are provided with stops 56 which are arranged in succession on a supporting rope at a mutually uniform distance. Provided in the transmission members 5a–5n, the suspension members 8 and the wheels 45, 51, 52, and 53, are openings (not shown) which are adjustable in size for receiving the stops 56. The transmission of the force of the ropes by means of the stops 56 offers the advantage that no differences in rate of circulation will occur between the transmission members 5a–5n and between the suspension members 8 as a result of stretch of the rope.

The course of the ropes will now be described with reference to rope 44. It will be clear that by analogy the description also applies to the rope 55, which has a similar course. The rope is trained on the transmission members 5a–5n in such a way that they are all driven in one and the same direction. Accordingly, in the unit 43, the influence of the rotation of the conveyor member 1 about the second line 10 on the rate of rotation of the conveyor member 1 about its axis 2 is substantially the same. This is particularly advantageous in conjunction with the increased accuracy of the mutual alignment of the orientations of the conveyor members 1 as obtained by the use of a control grid. The direction of transport of the articles conveyed over the table can be changed during transport without the articles being turned. Due to turning, the articles might be transferred to one of the discharge tracks in an oblique position, which might cause that article to become stuck against a side ridge of that track.

The course of the rope 44 shows intersections of a portion that is located between the transition members 5a and 5b and a portion that is located between the transmission members 5e and 5h, as well as of a portion that is located between the transmission members 5i and 5j and a portion that is located between the transmission members 5m and 5n. At the intersection, the intersecting portions of the rope 44 are preferably disposed at different levels so that contact between them is avoided. This can be readily accomplished in the course of the rope 44 as shown, in virtue of the fact that portions of the rope 44 which are located between intersecting portions of that rope 44 pass along four transmission members 5. The difference in level between the intersecting portions of the rope 44 can be achieved by providing the continuous grooves of the transmission members 5a–5h and 5i–5n, respectively, in a stepwise staggered relationship relative to each other. Relative to a plane parallel to the plane of transport 4, for instance, the groove of the transmission member 5a could be disposed at a level "0", while the grooves of the transmission members 5b–5h are located at levels disposed 1, 2, 3, 4, and 5 mm, respectively, above level "0". In this way a 1 mm difference between the respective levels of the successive transmission members 5a–5h yields a difference in height of more than 4.5 mm between the intersecting portions of the rope 44 at the intersection. The grooves of the transmission members 5i–5n may for instance be provided at 5, 4, 3, 2, 1 and 0 mm above said plane, so that between the intersecting portions of the rope 44 between the transmission members 5i and 5j and between the transmission members 5m and 5n, too, a difference in height of more than 4.5 mm is present and the continuous groove of the transmission member 5n will be disposed at the same level as the continuous groove of the transmission member 5a.

A further advantage of the invention is that the guard 13 affords the option of sucking off air through the openings 14, 34 or 36 along the conveyor members 1, so that an increased pressure force against the conveyor members is accomplished, particularly in the case of light, flexible articles, such as sheets of paper, so that they can be conveyed over the conveyor table at relatively high speeds, accurately, and with little or no slip, and blowing up of these articles is prevented. Due to the fact that air is sucked off only along the conveyor members, these articles are sucked against the guard 13 in the area between the conveyor members 1 to a limited extent only and the friction between the guard and the articles remains small.

Sucking off air along the conveyor members 1 can easily be accomplished by providing the conveyor table with means for creating a reduced pressure 70 under the guard 13 as shown schematically in FIG. 1 and FIG. 3.

In the conveyor members according to FIGS. 1–3, the axes of rotation 2 are oriented parallel to the guard 13. This offers the advantage that it enables an accurate rolling movement of the conveyor member 1 relative to an article to be transported over it. This is particularly advantageous in conjunction with the improved alignment, which can be obtained by using a control grid 42 or 60 for the accurate, controlled, translating transportation of articles over the conveyor table.

The surface of the guard 13 proximal to the plane of transport 4 is preferably made of smooth material, such as PTFE, PA or anodized aluminium, so that a minimal friction between articles guided along the guard 13 and the guard 13 itself is obtained.

Further, to reduce friction between articles guided along the guard 13 and the guard 13 itself, the surface of the guard 13 proximal to the plane of transport 4 comprises material for dissipating static electricity.

What I claim is:

1. A conveyor table for displacing along a transporting surface articles with at least one substantially flat side comprising:
    a support construction;
    a plurality of substantially rotation-symmetrical conveyor members each suspended for rotation about an axis thereof relative to the support construction and circumferential portions thereof defining the plane of transport, the direction of transport of said conveyor member being controllable by turning said transport member relative to said support construction about a second axis, the second axis being perpendicular to the plane of transport;
    a guard, parallel to the plane of transport, having substantially circular openings, one or more of said openings each having one of said conveyor members extending therethrough, and each of said conveyor members having its corresponding second axis extending substantially through the center of the corresponding one or more of said openings; and
    means for sucking of air along the conveyor members.

2. A conveyor table according to claim 1, wherein said means for sucking off air include means for creating a reduced pressure under the guard.

3. A conveyor table for displacing along a transporting surface articles with at least one substantially flat side comprising:
    a support construction;
    a plurality of substantially rotation-symmetrical conveyor members each suspended for rotation about an axis thereof relative to the support construction and circumferential portions thereof defining the plane of transport, the direction of transport of said conveyor member being controllable by turning said transport member relative to said support construction about a second axis, the second axis being perpendicular to the plane of transport;
    a guard, parallel to the plane of transport, having substantially circular openings, one or more of said openings each having one of said conveyor members extending therethrough, and each of said conveyor members having its corresponding second axis extending substantially through the center of the corresponding one or more of said openings;
    a plurality of suspension members, each suspension member suspending a corresponding one of the plurality of conveyor members, each suspension member being rotatable about the second axis of the corresponding conveyor member in a plane parallel to the support construction, each suspension member being provided with a control arm, each control arm being connected to each other control arm by means of a control grid, a free end of each other control arm being pivotally connected to the control grid, each control arm orienting each corresponding one of the plurality of conveyor members in the same direction as the other corresponding ones of the plurality of conveyor members.

4. A conveyor table according to claim 3, wherein the control grid is suspended in a plane that extends through the conveyor members and the suspension members and is provided with openings and recesses, the openings and recesses leaving space for one of the conveyor members and a corresponding suspension member, the conveyor table being formed in such a way that the control grid can be translatingly displaced in its plane relative to the second axis of each of said conveyor members along a part of a circular path having a radius equal to the distance between each of the second and the axis of the hinge at the free end of the corresponding control arm.

5. A conveyor table according to claim 3, wherein the transmission members are connected to be drivable in the same direction of rotation by one or more power sources.

6. A conveyor table for displacing along a transporting surface articles with at least one substantially flat side comprising:
- a guard, parallel to the transporting surface, forming a support construction, and having substantially circular openings;
- a plurality of substantially rotation-symmetrical conveyor members, each suspended for rotation about an axis thereof relative to the guard, each extending through one of the circular openings in the guard, and circumferential portions thereof defining the plane of transport, the direction of transport of said conveyor member being controllable by turning said conveyor member relative to said guard about a second axis, the second axis being perpendicular to the plane of transport;
- a plurality of suspension members, each suspension member suspended in corresponding openings in the guard, each suspension member suspending a corresponding one of the plurality of conveyor members, each suspension member being provided with a suspension member opening through which said conveyor member extends, each suspension member being substantially circular when viewed from a point perpendicular to the plane defined by the guard and filling up the corresponding opening except for an annular outer portion thereof; and
- said second axis located at a distance from a centerline of a corresponding transmission member, a shaft of each of the transmission members having one end thereof disposed remotely from the suspension member and rotatably and fixedly connected to a control grid, the control grid being adapted for translational displacement relative to the support construction along a circular path having a radius equal to the distance between the second axis and the centerline of the transmission member.

7. A conveyor table according to claim 6, wherein the axes of rotation of the conveyor members are parallel to the guard.

8. A conveyor table for displacing along a transporting surface articles with at least one substantially flat side comprising:
- a support construction;
- a plurality of substantially rotation-symmetrical conveyor members each suspended for rotation about an axis thereof relative to the support construction and circumferential portions thereof defining the plane of transport, the direction of transport of said conveyor member being controllable by turning said conveyor member relative to said support construction about a second axis, the second axis being perpendicular to the plane of transport;
- a plurality of transmission members, each transmission member being rotatable about a center line of each transmission member that is perpendicular to the plane of transport, and each transmission member being in driving contact with a corresponding one of said plurality of conveyor members;
- one or more common power sources for driving the transmission members;
- a guard, parallel to the plane of transport, having substantially circular openings, one or more of said openings each having one of said conveyor members extending therethrough, and each of said conveyor members having its corresponding line extending substantially through the center of the corresponding one or more of said openings;
- wherein one or more groups of six conveyor members, each of the six conveyor members being coupled with a transmission member, the transmission members being driven by an endless transmission device that engages with said transmission members, the transmission members being arranged in two parallel, opposite rows, each row consisting of three transmission members, the endless transmission device being wound about a first outer and a central pair of opposite transmission members and extending obliquely from each of the central pair of opposite transmission members to a transmission member that forms part of the other row and a second pair of outer transmission members, the endless transmission device passing between the transmission members of the second outer pair, the portions of the endless transmission device extending between the central and the second outer pair of transmission members intersecting each other and the transmission members succeeding each other along the course of the endless transmission device being arranged relatively to the plane of transport in a stepwise, vertically staggered relationship;
- wherein each transmission member is driveable in an identical direction of rotation by said one or more common power sources.

* * * * *